United States Patent [19]

Vanhoof et al.

[11] 3,923,887

[45] Dec. 2, 1975

[54] DERIVATIVES OF 2-AMINOINDANE, THE PREPARATION AND USE THEREOF

[75] Inventors: Pierre M. Vanhoof; Pierre M. Clarebout, both of Brussels, Belgium

[73] Assignee: A. Christiaens Societe Anonyme, Brussels, Belgium

[22] Filed: Feb. 5, 1974

[21] Appl. No.: 439,773

[30] Foreign Application Priority Data
Mar. 2, 1973 United Kingdom............... 10302/73
Feb. 5, 1973 United Kingdom................ 5631/73

[52] U.S. Cl.......... 260/562 N; 260/247.2; 260/268; 260/393.56; 260/326.3; 260/562 P; 424/324
[51] Int. Cl.²....................................... C07C 103/38
[58] Field of Search ..................... 260/562 N, 562 P

[56] References Cited
UNITED STATES PATENTS 2,948,736  8/1960  Martin ........................... 260/562 N
3,408,389  10/1968  Bernstein et al................ 260/562 N

OTHER PUBLICATIONS

Ann. Report of Tohoku College of Pharm., Dec. 1963 (Sendai, Japan), pp. 45–48.
J. Pharm. of Japan, 82, 12, 1597–1603 (1962).

*Primary Examiner*—C. Davis
*Attorney, Agent, or Firm*—Sughrue, Rothwell, Mion Zinn & Macpeak

[57] ABSTRACT

This invention relates to new derivatives of 2-aminoindane, namely N-phenyl-N-$R_1$,$R_2$-aminoalkanoyl-2-aminoindanes, in which $R_1$ represents hydrogen or a lower alkyl or hydroxyalkyl group and $R_2$ represents a lower alkyl or hydroxyalkyl group and may be different from $R_1$, said $R_1$ and $R_2$ may also form with the attached nitrogen atom a nitrogenous heterocyclic ring, as well as the acid addition salts of such derivatives.

These compounds have interesting antiarrhythmic properties.

5 Claims, No Drawings

DERIVATIVES OF 2-AMINOINDANE, THE PREPARATION AND USE THEREOF

BRIEF DESCRIPTION OF THE INVENTION

This invention relates to new derivatives of 2-aminoindane, to the use and preparation thereof.

The new derivatives of 2-aminoindane which are N-phenyl-N-$R_1$,$R_2$-aminoalkanoyl-2-aminoindanes may be represented by the following general formula:

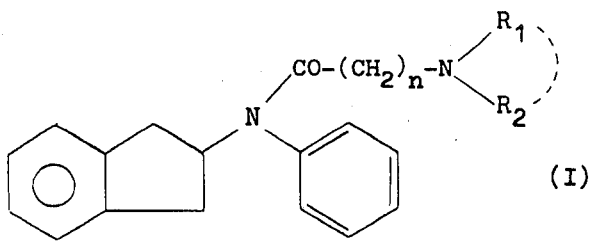

(I)

in which $n = 1$ or 2, $R_1$ represents hydrogen or a lower alkyl or hydroxyalkyl group containing 1 to 3 carbon atoms, $R_2$ represents a lower alkyl or hydroxyalkyl group containing 1 to 3 carbon atoms, whereby $R_1$ and $R_2$ may represent identical or different groups, whereas $R_1$ and $R_2$ may form together with the attached nitrogen atom a nitrogenous heterocyclic ring such as morpholine, pyrrolidine, piperidine or piperazine ring.

This invention relates also to the acid addition salts, such as the hydrochlorides, of the new derivatives of 2-aminoindane of formula (I).

It has been found that the new derivatives of 2-aminoindane of the formula (I) have interesting pharmacological properties.

This invention relates therefore also to pharmaceutical compositions containing, as active ingredient, at least one compound of the general formula (I), together with a pharmaceutically acceptable carrier or excipient.

DETAILED DESCRIPTION OF THE INVENTION

It has been surprisingly found that the compounds of the general formula (I) are very active for the treatment of heart arrhythmia.

Said compounds can be used for the treatment of various heart diseases such as premature heart contractions, ventricular and supraventricular tachycardias either idiopathic or subsequent to a cardiopathia or to a coronary disease, cardiac arrhythmias due to digitalin intoxication, as well as atrial fibrillation and flutter, particularly in the early stage.

It is known (see Koch-Weser, J. Arch. Int. Med. 129; 763, 1972) that none of the presently available antiarrhythmic agents are satisfactory for the prophylaxis of tachycardias and fibrillation of ventricular origin.

The oral activity of the known antiarrhythmic agents, such as procainamide or lidocaine, is either too short leading to multiple day and night administration (for example with procainamide) or too low to be of some practical utility (for example with lidocaine) or their therapeutic activity is conjugated with frequent and dangerous side effects, such as hypotension (with procainamide), sudden death, agranulocytosis or idiosyncrasy.

The compounds of general formula (I) according to this invention are very active when orally administered, although they may also be administered parenterally. They have also a long activity duration and are not depressant for the myocardial function.

Applicants do not know any orally active antiarrhythmic agent which does not act at the same time as a depressant of the myocardial function.

The oral antiarrhythmic activity of the compounds of formula (I) has been proved by tests on rats using aconitine which is a compound causing premature heart contractions and death of the animals.

The method used for these tests is described hereafter:

Animals

Male or female rats with a body-weight ranging from 380 to 450 g.

Aconitine solution 3.12 $\mu$g aconitine nitrate/1 ml physiological saline.

Solution of the compound to be tested 0.75% in distilled water.

Method

Six randoms selected animals are required for each compound to be tested. The compound is administered by oral route at the dose of 75 mg/kg (1 ml of the 0.75% solution/100 g of body-weight) 75 minutes before the intravenous perfusion of the aconitine solution is initiated.

Control groups of animals are treated only with distilled water (1 ml/100 g).

Sixty minutes after the administration of the compound to be tested, the animals are anesthesized by an intraperitoneal injection of Pentobarbital (50 mg/kg) and the jugular vein is dissected.

A catheter is introduced in the vein and fixed by a pigature. The ECG (D II derivation) is then continuously recorded. The perfusion of the aconitine solution is started 75 minutes after the administration of the compound to be tested. The volume delivered by the injection device being 0.287 ml/minute, the dose of aconitine nitrate administered is 0.895 $\mu$g/minute (0.20 – 0.24 $\mu$g/100 g/minute according to the minimal and maximal weight of the animals).

The experience is stopped as soon as the first extrasystoles are appearing and the time elapsed from the beginning of the perfusion is noted.

The results are expressed as the mean total dose of aconitine injected in a group of animals.

The relative acitivity between a tested compound and a reference substance (lidocaine, procainamide) is computed in the following way:

$$A(x) = \frac{\overline{X} - \overline{C}}{\overline{R} - \overline{C}} \times 100$$

where
$A(x)$ = activity of tested compound X (in %)
$\overline{X}$ = mean dose of aconitine in the animals treated by compound X
$\overline{C}$ = mean dose of aconitine injected in the untreated animals (controls)

$\bar{R}$ = mean dose of aconitine injected in the animals treated by the reference substances.

The following table gives the results of the evaluation of the antiarrhythmic activity by oral route of a great number of acid addition salts of compounds of formula (I), compared to the activity of two well known antiarrhythmic agents (procainamide and lidocaine).

| | Compounds of formula (I) | | | Activity in % compared with | |
|---|---|---|---|---|---|
| | n |  | | Lidocaine | Procainamide |
| 933 | 1 | dimethylamino | | 158 | 202 |
| 934 | 1 | diethylamino | | 734 | 936 |
| 935 | 1 | methylpiperazino | | 332 | 423 |
| 936 | 1 | piperidino | | 404 | 516 |
| 937 | 2 | dimethylamino | | 531 | 677 |
| 938 | 2 | diethylamino | | 842 | 1074 |
| 939 | 2 | methylpiperazino | | 544 | 694 |
| 940 | 2 | piperidino | | 656 | 837 |
| 1400 | 2 | monoethylamino | | 733 | 936 |

The compounds of the formula (I) may be administered orally or parenterally.

Oral preparations may be administered under the form of capsules, tablets, pills and the like. Each capsule, tablet or pill may contain from 10 to 200 mg of a compound of formula (I) as active ingredient, together with pharmaceutically acceptable excipients or carriers.

Parenteral preparations may consist in a solution for perfusion or for intravenous or intramuscular injection. Such a solution may contain from 0.2 per thousand to 2 per thousand of a compound of formula (I).

The parenteral preparation may be either a solution which may be directly used for the perfusion and contains a proportion of the active ingredient within the above limits, or a concentrated solution containing 1 to 10% of the active ingredient, said concentrated solution being diluted when administered to a patient.

The initial dose of active ingredient may be of 200 to 800 mg per day during 2 or 3 days, the maintenance dose being of about 25 mg to 300 mg per day.

If a single dose is sufficient for obtaining the therapeutic effect, this dose is generally comprised between 50 and 300 mg.

The active ingredient may be administered at the same time by the parenteral route (for example by perfusion) and by the oral route.

This invention also relates to processes for preparing the new compounds of formula (I).

The new compounds may be prepared by a process in which 2-phenylaminoindane (II) which is a known compound (see Belgian Pat. No. 760,018) is acylated by means of a chloride of halogenated aliphatic acid of the formula $$ClCO(CH_2)_n\text{—Hal} \quad \text{(III)}$$

in which Hal represents a halogen atom and $n = 1$ or $2$ and the obtained acylated compound (IV) which is a 2-(N-haloalkanoyl-N-phenylamino)-indane is reacted with an amine of the formula

in which $R_1$ and $R_2$ have the above meanings.

These reactions may be represented as follows:

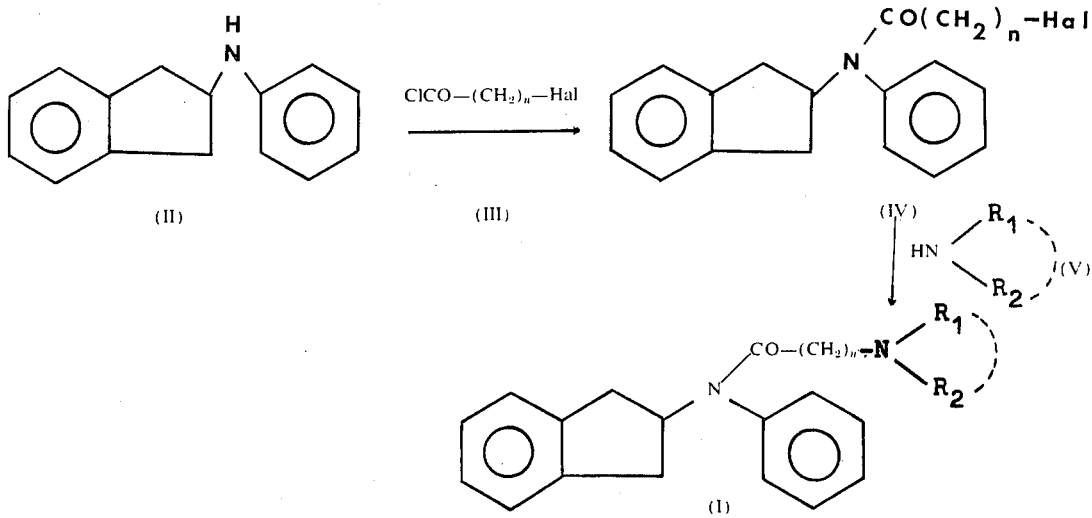

The following Examples 1 to 13 illustrate the preparation of new compounds of formula (I).

EXAMPLE 1

Preparation of the hydrochloride of N-phenyl-N-diethylaminoacetyl-2-aminoindane ($n = 1$; $R_1 = R_2 = C_2H_5$ in formula I).

8.4 g of 2-phenylaminoindane (II) are refluxed during 5 hours in benzene in the presence of 4.7 ml of the chloride of chloracetic acid (formula III: Hal = Cl; $n = 1$). The solvent is then removed under vacuum and the residual oil is treated with 100 ml of ethanol. 10 ml of diethylamine (formula V: $R_1 = R_2 = C_2H_5$) are added and the mixture is refluxed during 24 hours in an autoclave. The solvent is then removed under vacuum and the residue is extracted with 1N hydrochloric acid.

The obtained solution is made alkaline by means of ammonium hydroxide and the obtained product is extracted by means of an organic solvent which is not miscible with water, for example chloroform. After drying on sodium carbonate, the mixture is filtered and the chloroform is removed. The residual oil mixed with water is treated by means of hydrochloric acid so as to obtain the desired hydrochloride which is recrystallized from benzene. Melting point: 183° – 186°C Analysis: % calculated: C 70.27; H 7.58; N 7.80; Cl 9.88 % found: C 70.50; H 7.58; N 7.93; Cl 9.97

EXAMPLE 2

Preparation of the hydrochloride of N-phenyl-N-dimethylaminoacetyl-2-aminoindane ($n = 1$; $R_1 = R_2 = CH_3$ in formula I).

This compound is prepared in the manner described in example 1, except that dimethylamine is used instead of diethylamine, the final compound being recrystallized from isopropanol. The hydrochloride melts at 224°–226°C. Analysis: % calculated: C 68.97; H 6.98; N 8.47; Cl 10.72 % found: C 68.93; H 7.06; N 8.30; Cl 10.85

EXAMPLES 3 to 11

The following compounds of formula (I) have been prepared by the method described in Example 1, using the appropriate amine of formula (V):

EXAMPLE 3 hydrochloride of N-phenyl-N-methylpiperazinoacetyl-2-aminoindane

(formula I : n = 1 : = methylpiperazino)

EXAMPLE 4 hydrochloride of N-phenyl-N-piperidinoacetyl-2-aminoindane

(formula I : n = 1 : = piperidino)

EXAMPLE 5 hydrochloride of N-phenyl-N-dimethylaminopropionyl-2-aminoindane (formula I: $n = 2$; $R_1 = R_2 = CH_3$)

EXAMPLE 6 hydrochloride of N-phenyl-N-diethylaminopropionyl-2-aminoindane (formula I: $n = 2$; $R_1 = R_2 = C_2H_5$)

EXAMPLE 7 hydrochloride of N-phenyl-N-methylpiperazinopropionyl-2-aminoindane

(formula I : n = 2 : = methylpiperazino)

EXAMPLE 8 hydrochloride of N-phenyl-N-piperidinopropionyl-2-aminoindane

(formula I : n = 2 : = piperidino)

EXAMPLE 9 hydrochloride of N-phenyl-N-dihydroxyethylaminopropionyl-2-aminoindane (formula I: $n = 2$; $R_1 = R_2 = $ hydroxyethyl)

EXAMPLE 10 hydrochloride of N-phenyl-N-monoethylaminoacetyl-2-aminoindane (formula I: $n = 1$; $R_1 = H$; $R_2 = C_2H_5$)

EXAMPLE 11 hydrochloride of N-phenyl-N-monoethylaminopropionyl-2-aminoindane (formula I: $n = 2$; $R_1 = H$; $R_2 = C_2H_5$)

The following table I gives the melting point, the recrystallization solvents and the analytical data of the various hydrochlorides of the compounds of the formula (I) of Examples 3 to 11.

TABLE I

| Ex. | M.P. °C | Recryst. solvents | | Analysis | | | |
|---|---|---|---|---|---|---|---|
| | | | | C | H | N | Cl |
| 3 | 204–205 | isopropanol | Calc. | 68.46 | 7.31 | 10.88 | 9.19 |
| | | | Found | 68.92 | 7.51 | 10.91 | 9.11 |
| 4 | 209–212 | chloroform | Calc. | 71.23 | 7.34 | 7.55 | 9.56 |
| | | | Found | 71.00 | 7.31 | 7.57 | 9.50 |
| 5 | 194–196 | isopropanol | Calc. | 69.65 | 7.31 | 8.12 | 10.28 |
| | | | Found | 69.75 | 7.47 | 8.15 | 10.30 |
| 6 | 142–145 | benzene | Calc. | 70.84 | 7.83 | 7.51 | 9.51 |
| | | | Found | 71.01 | 7.84 | 7.61 | 9.61 |
| 7 | 202–204 | chloroform/ benzene | Calc. | 69.06 | 7.56 | 10.50 | 8.86 |
| | | | Found | 69.29 | 7.66 | 10.11 | 8.62 |
| 8 | 153–155 | benzene | Calc. | 71.76 | 7.59 | 7.28 | 9.21 |
| | | | Found | 71.48 | 7.67 | 7.06 | 9.14 |
| 9 | 132–133 | isopropanol | Calc. | 65.25 | 7.22 | 6.92 | 8.76 |
| | | | Found | 65.26 | 7.17 | 7.10 | 8.80 |
| 10 | 223–224 | methanol/ acetone | Calc. | 68.97 | 7.00 | 8.46 | 10.71 |
| | | | Found | 68.89 | 6.85 | 8.57 | 10.69 |
| 11 | 180.5 | methanol/ methylethyl ketone | Calc. | 69.65 | 7.31 | 8.12 | 10.28 |
| | | | Found | 69.67 | 7.10 | 8.21 | 10.27 |

EXAMPLE 12

Preparation of N-phenyl-N-(α-diethylaminopropionyl)-2-aminoindane (formula I: $R_1 = R_2 = C_2H_5$; $n = 2$).

18.5 g (0.062 mole) of N-phenyl-N-(α-chloropropionyl)-2-aminoindane, 60 ml of anhydrous ethanol and 21 ml of diethylamine (0.19 mole) are heated at 120°C in an autoclave during 24 hours.

By recrystallization of the residue obtained by concentration to dryness from petroleum ether (B.P. 40°–60°C), the desired product melting at 74°–75°C is obtained. Analysis: % calculated: C 78.53; H 8.39; N 8.33 % found: C 78.44; H 8.55; N 8.60

EXAMPLE 13

Preparation of N-phenyl-N-(β-hydroxyethyl-ethylaminopropionyl)-2-aminoindane hydrochloride (formula I: $n = 2$; $R_1 = C_2H_5$; $R_2 = CH_2CH_2OH$).

20 g of N-phenyl-N-(β-chloropropionyl)-2-aminoindane, 17.83 g of ethylethanolamine and 100 ml of ethanol are refluxed during 24 hours. After evaporation of the volatile materials, 150 ml of a 0.1N sodium hydroxide solution are added and the mixture is extracted with benzene. The residue of the benzene solution is dissolved in ether, a stream of gaseous hydrochloric acid being then passed through the ether solution. After recrystallization from methylethylketone, the desired hydrochloride melts at 90°–95°C. Analysis: % calculated: C 67.93; H 7.52; N 7.20; Cl 9.11 % found: C 68.12 H 7.64; N 7.50; Cl 9.17

The following Examples 14–17 illustrate pharmaceutical compositions of this invention for the treatment of heart arrhythmy.

EXAMPLE 14

| CAPSULE: | |
|---|---|
| Active ingredient of formula I | 100 mg |
| Lactose | 120 mg |
| Rice starch | 30 mg |
| Corn starch | 30 mg |
| Colloidal silica | 1 mg |
| | for one capsule |

EXAMPLE 15

| TABLET: | |
|---|---|
| Active ingredient of formula I | 200 mg |
| Potato Starch | 120 mg |
| Lactose | 80 mg |
| Starch sodium glycollate | 30 mg |
| Colloidal silica | 15 mg |
| Magnesium stearate | 5 mg |
| hydroxy propylcellulose | 4 mg |
| Stearic acid | 2 mg |
| | for one tablet |

EXAMPLE 16

| PILLS: | |
|---|---|
| Core: | |
| Active ingredient of formula I | 50.0 mg |
| Lactose | 67.5 mg |
| Microcrystalline cellulose | 32.0 mg |
| Starch sodium glycollate | 8.2 mg |
| Colloidal silica | 0.4 mg |
| Magnesium stearate | 0.9 mg |
| Coating: | |
| Shellac | 1.0 mg |
| Sandarac | 0.2 mg |
| Castor oil | 0.3 mg |
| Gum arabic | 7.0 mg |
| Talc | 11.2 mg |
| Corn starch | 1.0 mg |
| Titanium oxide | 1.3 mg |
| Dyestuff | 4.0 mg |
| Sucrose | 142.8 mg |
| White wax / Carauba wax | 0.2 mg |
| | for one pill |

EXAMPLE 17 -continued

| Solution for perfusion: | |
|---|---|
| Active ingredient of formula I | 200 mg |
| Anhydrous sodium sulfite | 60 mg |
| Anhydrous sodium metabisculfite | 140 mg |
| Sodium chloride | 1.7 mg |
| Water for injection | ad 200 ml |

What we claim is:

1. New derivatives of 2-aminoindane of the general formula:

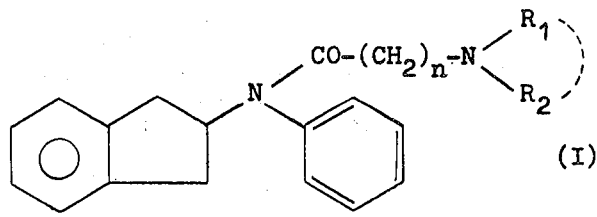

in which $n = 1$ or 2, $R_1$ represents hydrogen or a lower alkyl or hydroxyalkyl group containing 1 to 3 carbon atoms, $R_2$ represents a lower alkyl or hydroxyalkyl group containing 1 to 3 carbon atoms, whereby $R_1$ and $R_2$ may represent identical or different groups, as well as the acid addition salts of said new derivatives of 2-aminoindane.

2. New derivative of 2-aminoindane according to claim 1, in which $n = 1$, whereas $R_1$ and $R_2$ represent an ethyl group, as well as the acid addition salts thereof.

3. New derivative of 2-aminoindane according to claim 1, in which $n = 2$, whereas $R_1$ and $R_2$ represent an ethyl group, as well as the acid addition salts thereof.

4. New derivative of 2-aminoindane according to claim 1, in which $n = 2$, whereas $R_1$ represents hydrogen and $R_2$ represents an ethyl group, as well as the acid addition salts thereof.

5. A process for preparing new derivatives of 2-aminoindane of the general formula:

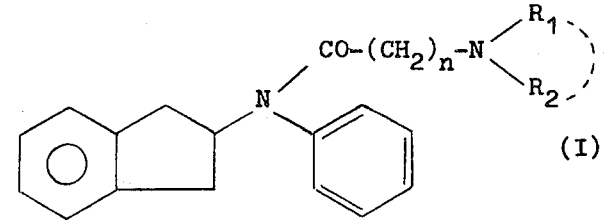

in which $n = 1$ or 2, $R_1$ represents hydrogen or a lower alkyl or hydroxyalkyl group containing 1 to 3 carbon atoms, $R_2$ represents a lower alkyl or hydroxyalkyl group containing 1 to 3 carbon atoms, whereby $R_1$ and $R_2$ may represent identical or different groups, as well as the acid addition salts of said new derivatives of 2-aminoindane, said process comprising the steps of acylating 2-phenylaminoindane by means of a chloride of an halogenated aliphatic acid of the formula:

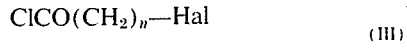

in which Hal represents a halogen atom and $n = 1$ or 2, and reacting the obtained 2-(N-haloalkanoyl-N-phenylamino)indane with an amine of the formula:

in which $R_1$ and $R_2$ have the above meanings, the obtained compound of formula (I) being finally converted, if desired, into an acid addition salt.

* * * * *